United States Patent [19]
Menke

[11] Patent Number: 4,763,000
[45] Date of Patent: Aug. 9, 1988

[54] SYSTEM FOR PASSIVE AND OPTICAL-MECHANIC SCANNING OF A VISUAL FIELD

[75] Inventor: Josef F. Menke, Glücksburg, Fed. Rep. of Germany

[73] Assignee: Carl Zeiss-Stiftung, Oberkochen, Fed. Rep. of Germany

[21] Appl. No.: 45,753

[22] Filed: Apr. 4, 1987

Related U.S. Application Data
[63] Continuation of Ser. No. 519,690, Aug. 2, 1983.

[30] Foreign Application Priority Data
Aug. 3, 1982 [DE] Fed. Rep. of Germany ....... 3228914

[51] Int. Cl.$^4$ ............................................. H04N 5/33
[52] U.S. Cl. .................................... 250/334; 250/339
[58] Field of Search ................. 250/334, 339; 350/6.8, 350/6.4, 6.1

[56] References Cited
U.S. PATENT DOCUMENTS

| | | | |
|---|---|---|---|
| 3,287,559 | 11/1966 | Barnes | 250/334 |
| 3,804,976 | 4/1974 | Gard | 25/334 |
| 4,111,383 | 9/1978 | Allen et al. | 244/3.13 |
| 4,225,883 | 9/1980 | Vanatta et al. | 250/334 |
| 4,234,241 | 11/1980 | Schmidt | 350/6.9 |
| 4,419,692 | 12/1983 | Modisette et al. | 250/334 |
| 4,426,640 | 1/1984 | Becconsall et al. | 250/339 |
| 4,542,986 | 9/1985 | Berdanier | 250/334 |

FOREIGN PATENT DOCUMENTS

| | | | |
|---|---|---|---|
| 2841777 | 9/1978 | Fed. Rep. of Germany | 350/6.8 |
| 3142704A1 | 5/1983 | Fed. Rep. of Germany | 250/334 |
| 3228914C2 | 1/1986 | Fed. Rep. of Germany | 250/334 |

Primary Examiner—Janice A. Howell
Assistant Examiner—Richard Hanig
Attorney, Agent, or Firm—Toren, McGeady & Associates

[57] ABSTRACT

Disclosed is a system for passive and active optical-mechanical scanning of a visual field. A passive channel uses a thermal imaging system scanning in two coordinates and an active channel uses a laser beam which is deflected in two coordinates. During scanning in the active and passive channel specific phase relations are maintained. The system according to the invention represents a device for passive and active scanning of a visual field which works with low transmitting power and in which the mutual interference of active and passive channels is prevented. The system can be used particularly for steering (active channel) of flying bodies or for the control of machines or devices over certain distances.

24 Claims, 1 Drawing Sheet

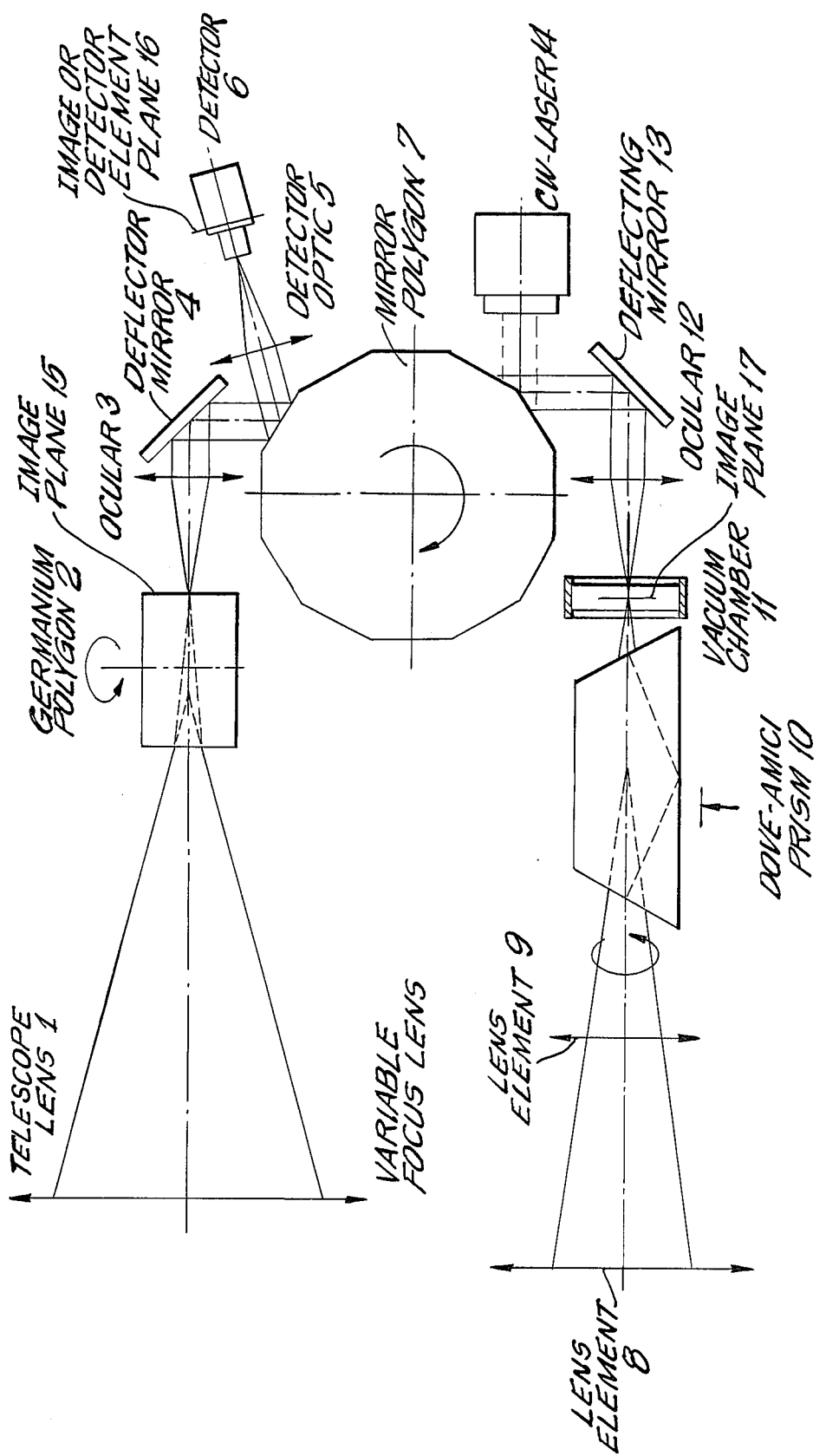

SYSTEM FOR PASSIVE AND OPTICAL-MECHANIC SCANNING OF A VISUAL FIELD

BACKGROUND OF THE INVENTION

This is a continuation of application Ser. No. 519,690, filed Aug. 2, 1983.

Field of the Invention

The invention relates to a system for passive and active optical-mechanical scanning of a visual field and has particular importance in the detection and pursuance of a target by defining the line of sight with a laser beam which is modulated with respect to space and time.

In known beam-rider processes and systems, a beam is modulated with respect to space and time by the motion of a modulation disk in the visual field of a projector. Such methods and arrangements have the disadvantage that beams are always sent over the entire visual field, which means that very strong light sources are needed. In addition, the transmitter can continuously be located in the entire visual field. The disadvantage of the very high transmitting power can be avoided if the visual field is scanned like a screen with a laser beam. When the laser and the thermal imaging system operate in the same spectral range, the thermal imaging system may be disturbed by return-reflection of the laser light.

An object of the invention is to create a system for passive and active scanning of a visual field which functions with low transmitting power and which excludes mutual interference of the active and the passive channel.

The solution of this task is obtained by means of the technical teaching that the passive channel is a thermal imaging system which scans in two coordinates and the active channel is a laser beam deflected in two coordinates, and, during the scanning, specific phase relations are maintained in the active and the passive channel.

According to the invention, the passive channel of the system uses a thermal imaging device which scans in cartesian coordinates and which observes and holds the target by swivelling the device in the image center that is displayed for instance with focused crosswires or a focused reticule. In the active channel, a laser beam is also deflected in two directions. The centers of the visual fields of the thermal imaging system and the laser scanner are made to coincide. Scanning of the laser may occur in a cartesian or polar manner. With polar scanning, when radial scanning is performed with a mirror polygon which operates in common in both channels and corresponding to the line frequency of the thermal imaging device and the rotation of this "spoke" is performed with a reversing optical element, then significantly increased information density is obtained in the center of the image.

Keeping the wavelength of the laser so it does not lie in the spectral range of the thermal imaging system prevents interference of the thermal imaging system by the laser. However, it is possible that due to meteorological conditions the transparency of the atmosphere can be high for the thermal imaging channel but so low in the area of the laser channel that steering of a flying body having a receiver for the laser beam is no longer possible. The reverse may also occur. It is therefore advantageous to use a laser which transmits in the spectral range of the thermal imaging system. In order to prevent interference of the thermal imaging system by the laser, the invention operates as follows: The thermal imaging system and the laser scanner are constructed so that the line scanning and the radial scanning always have a degree of efficiency of 50%.

When the phase positions are placed with respect to one another in such a way that only one channel is active at any time, then a mutual interference is excluded.

When for instance a flying body having a receiver for the laser beam approaches the target, then on the one hand the angular range, related to the scanner, in which the flying body can move becomes increasingly smaller, on the other hand the requirement for accuracy of the transmitted deviation information increases. According to the invention, the system can be adapted to these requirements in that in the active laser channel, a variable focus lens is used whose focal length is increased by program-control during the flying time of the flying body. Because here also due to reduction of the laser divergence the energy density of the laser beam is increased, the range is simultaneously increased at a predetermined laser power.

An exemplified embodiment is shown in the drawing:

An IR beam passes through a lens 1 and arrives at a germanium-polygon 2 on whose rear edge lies an image plane 15. An ocular 3 and a deflecting mirror 4 pass the beam so it strikes a mirror polygon 7 and reaches the pupil of detector optics 5 and subsequently a detector 6 with an image or detector-element plane 16. Scanning of the thermal image essentially takes place in two directions, perpendicular to one another. Fast scanning in the line direction takes place by virtue of the mutual rotating mirror polygon 7 and the slower image sequence scanning due to the rotating refractive germanium-polygon 2.

A beam, originating from a laser 14, strikes the mirror polygon 7 which is also assigned to the thermal imaging channel, strikes a deflecting mirror 13, and reaches the pupil of an ocular 12. From this an image is produced in a vacuum chamber 11 at an image plane 17. This optionally used vacuum chamber 11 serves to avoid possible ionization affects in the image plane 17 of the laser 14. Reversing optics 10 (Dove-Amici Prism) directs the laser beam outwardly through lens elements 8 and 9.

The deflection of the laser beam takes place in one direction by virtue of the rotating mirror polygon 7, and in the polar direction by rotation of the reversing optics 10.

The thermal imaging system supplies an image composition according to the standards of the Comite Concultatif International de Radiocommunication (CCIR).

I claim:

1. A system for passive and active optical-mechanical scanning of a visual field, characterized in a passive channel having a detector and a thermal imaging system scanning in two coordinates for receiving light from the visual field, and an active channel having a laser for producing a beam and means for deflecting the beam in two coordinates, and means for maintaining specific phase relations during scanning in said active and said passive channel such that only one channel is effective at any time by alternately directing the laser beam onto the visual field and then directing light from the visual field onto the detector.

2. A system according to claim 1, characterized in that at least one optical-mechanical scanning element (7) is used by both channels.

3. A system according to claim 1, characterized in that said thermal imaging system supplies an image composition according to CCIR standards.

4. A system according to claim 2, characterized in that said thermal imaging system supplies an image composition according to CCIR standards.

5. A system according to claim 1, characterized in that the optical-mechanical scanning in said laser channel takes place in a cartesian manner.

6. A system according to claim 2, characterized in that the optical-mechanical scanning in said laser channel takes place in a cartesian manner.

7. A system according to claim 3, characterized in that the optical-mechanical scanning in said laser channel takes place in a cartesian manner.

8. A system according to claim 4, characterized in that the optical-mechanical scanning in said laser channel takes place in a cartesian manner.

9. A system according to claim 1, characterized in that the optical-mechanical scanning in said laser channel takes place in a polar manner.

10. A system according to claim 2, characterized in that the optical-mechanical scanning in said laser channel takes place in a polar manner.

11. A system according to claim 3, characterized in that the optical-mechanical scanning in said laser channel takes place in a polar manner.

12. A system according to claim 4, characterized in that the optical-mechanical scanning in said laser channel takes place in a polar manner.

13. A system according to claim 1, characterized in that a lens arrangement is connected in front of the laser beam and has a variable focus.

14. A system according to claim 2, characterized in that a lens arrangement is connected in front of the laser beam and has a variable focus.

15. A system according to claim 3, characterized in that a lens arrangement is connected in front of the laser beam and has a variable focus.

16. A system according to claim 4, characterized in that a lens arrangement is connected in front of the laser beam and has a variable focus.

17. A system according to claim 5, characterized in that a lens arrangement is connected in front of the laser beam and has a variable focus.

18. A system according to claim 6, characterized in that a lens arrangement is connected in front of the laser beam and has a variable focus.

19. A system according to claim 7, characterized in that a lens arrangement is connected in front of the laser beam and has a variable focus.

20. A system according to claim 8, characterized in that a lens arrangement is connected in front of the laser beam and has a variable focus.

21. A system according to claim 9, characterized in that a lens arrangement is connected in front of the laser beam and has a variable focus.

22. A system according to claim 10, characterized in that a lens arrangement is connected in front of the laser beam and has a variable focus.

23. A system according to claim 11, characterized in that a lens arrangement is connected in front of the laser beam and has a variable focus.

24. A system according to claim 12, characterized in that a lens arrangement is connected in front of the laser beam and has a variable focus.

* * * * *